United States Patent [19]

Echols

[11] 4,341,004

[45] Jul. 27, 1982

[54] TOOL FOR INSTALLING FREEZE PLUGS

[76] Inventor: Charles R. Echols, 15841 N. 66th Ave., Glendale, Ariz. 85306

[21] Appl. No.: 182,837

[22] Filed: Aug. 29, 1980

[51] Int. Cl.[3] .............................................. B23P 19/04

[52] U.S. Cl. ...................................................... 29/275

[58] Field of Search ...................... 81/8.4, 463; 29/254, 29/255, 275

[56] References Cited

U.S. PATENT DOCUMENTS 3,064,342 11/1962 Wagoner .............................. 29/275
3,710,655 1/1973 Brandle ................................ 81/463
4,103,409 8/1978 Young .
4,229,870 10/1980 Tate .................................... 29/275

*Primary Examiner*—Robert C. Watson
*Attorney, Agent, or Firm*—Cahill, Sutton & Thomas

[57] ABSTRACT

A centrally oriented circular land for engaging the cylindrical shroud of a freeze plug is disposed on one side of a disc. A partial spherical depression in the other side of the disc interconnects with a spherical member at one end of a driver which interconnection transmits a force applied by the driver through the disc to the freeze plug to seat the freeze plug irrespective of the angular orientation between the respective axis of the driver and the disc.

4 Claims, 6 Drawing Figures

TOOL FOR INSTALLING FREEZE PLUGS

The present invention relates to tools and, more particularly, to a tool for installing freeze plugs.

Internal combustion engines, particularly automotive internal combustion engines, include various apertures disposed in the walls thereof. These apertures must be sealed to permit operation of the engine. Such seals may leak or may have to be removed from time to time for purposes of repair or reconstruction of the internal combustion engine.

Automotive freeze plugs are generally cupped shaped elements having a cylindrical shroud, the exterior surface of which mates with the walls of the apertures to effect a seal. Usually, the material of the plug is somewhat deformable as the fit is a force fit and deformation is necessary to obtain a long lasting seal sufficient to withstand the pressures imposed attendant normal operation of the engine. The freeze plugs are inserted base first and the force imparted thereto to seat the freeze plugs is directed to the annular surface presented by the terminal end of the shroud.

Various tools have been developed for installing freeze plugs of the type described above. In example, in U.S. Pat. No. 2,860,535 there is shown a tool useful for this purpose. The tool includes a handle having a threaded stud for threadedly engaging the center of a distribution plate. An adapter is threadedly engaged with the stud to draw the adapter adjacent the distribution plate. The adapter mates with the seal to be installed. An impact force is applied to the handle, which force is translated through the distribution plate and the adapter to drive the seal into the aperture or passageway to be sealed. The configuration of the tool implicitly requires that sufficient clearance exists external to the aperture supporting wall along the longitudinal axis of the passageway to be sealed to accommodate both the handle and the hammer or other apparatus for striking the handle to impart an impact force thereto. Misalignment between the axis of the handle and the axis of the passageway defining the aperture to be sealed is not tolerable.

When freeze plugs are to be installed in automotive internal combustion engines, ancillary equipments of the engine usually preclude sufficient clearance attendant the apertures to be sealed to permit use of the tool described in U.S. Pat. No. 2,860,535, unless the ancillary equipments are first removed. The time required for such removal, when translated into labor costs, represents a very substantial part of the cost for installing freeze plugs in such engines.

U.S. Pat. No. 2,998,644 describes and illustrates a tool very similar to that described above except that the adapter member is of flexible material. As such, it need not be rigidly secured to the force distribution plate but is frictionally resiliently retained thereon. The use of a nonrigid friction plate tends, as intended by the inventor, to ameliorate the sharpness of an impact force transmitted by the distribution plate.

With this tool also, misalignment is not tolerable and sufficient clearance must exist in line with the longitudinal axis of the passageway defining the aperture to be sealed to accommodate the handle and the implement employed to impart an impact force to the handle. Again, the tight quarters normally attendant the engine compartment of an automotive internal combustion engine usually requires temporary removal of various ancillary equipments to achieve the requisite clearance.

It is therefore a primary object of the present invention to provide a tool for seating freeze plugs which tool does not require substantial clearance along a longitudinal axis extending from a passageway opening to be sealed.

Another object of the present invention is to provide a tool for seating freeze plugs which is useable within confined quarters.

Yet another object of the present invention is to provide a tool for seating freeze plugs which transmits an impact force to the freeze plug from a source which may be substantially non-aligned with the axis of the aperture.

Still another object of the present invention is to provide a tool for seating freeze plugs which freeze plugs need not be in near perfect alignment with the aperture to be sealed.

A further object of the present invention is to provide a tool for seating freeze plugs which includes a disc-like element sized to the freeze plug and a cooperating but nonfixedly attached driver.

A still further object of the present invention is to provide a freeze plug tool having a two sided disc-like element for seating either of two differently sized freeze plugs and cooperating with a common driver.

A still further object of the present invention is to provide tool set having a plurality of two sided disc-like elements, each of which sides is sized to a different freeze plug and all of which disc elements are individually cooperatively engageable with a common driver.

These and other objects of the present invention will become apparent to those skilled in the art as the description of the present invention proceeds.

The present invention may be described with greater specificity and clarity with reference to the following drawings, in which.

Figure 1:
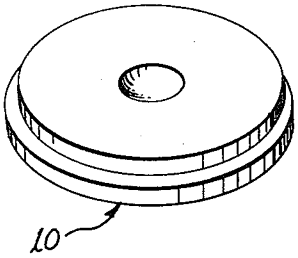
FIG. 1 is a perspective view of an impact distribution plate.
Figure 2:
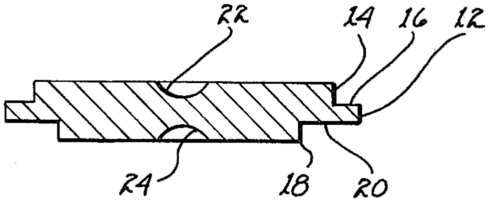
FIG. 2 is a diametric cross-sectional view of an impact distribution plate.
Figure 4:
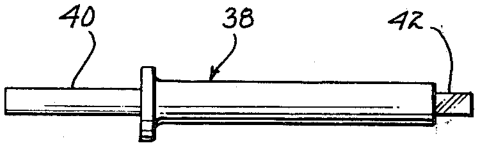
FIG. 4 illustrates an extension for use in conjunction with the driver shown in FIG. 3.

Impact distribution plate 10 illustrated in FIGS. 1 and 2 includes a disc 12 of a radius equal to or exceeding the perimeter of the shroud of a freeze plug to be driven. A circular land 14 is centered upon and extends axially of disc 12. The diameter of land 14 is selected to be somewhat less than that of the internal diameter of the shroud of the freeze plug. Thereby, land 14 nests within the shroud of the freeze plug and centers the impact distribution plate with respect to the freeze plug. The annular terminal end of the shroud mates with and rests upon annular band 16 disposed radially intermediate the perimeters of land 14 and disc 12.

A second land 18 may be disposed on the opposite side of disc 12, which land is diametrically sized to cooperate with a freeze plug different in diameter from that with which land 14 is employed. Land 18 defines an annular band 20 which contactingly engages the annular terminal end of the respective freeze plug.

A semi-spherical or partially spherical depression 22 is disposed within and central to land 14. A similar depression 24 is disposed within land 18. Each of these depressions engagingly nonfixedly receives an operative element of a driver. That is, when land 14 is disposed within the shroud of a freeze plug, the operative end of the driver is inserted within depression 24. When land 18 is placed within the shroud of a freeze plug, the operative end of a driver is disposed in depression 22.

Figure 3:
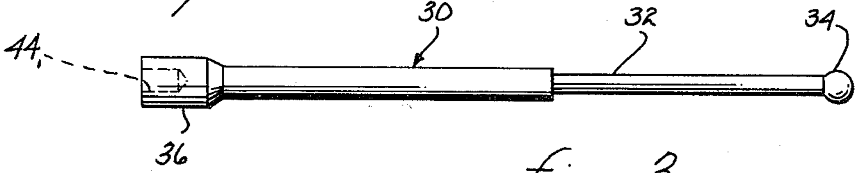
FIG. 3 illustrates a driver useable in conjunction with an impact distribution plate.

A driver 30 engageable with disc 10 is illustrated in FIG. 3. The driver includes a shaft 32 supporting an end 34 for mating engagement with one of depressions 22 and 24 of the impact distribution plate. Preferably, the end is semi-spherical or partially spherical in configuration. The shaft, which may be stepped as illustrated, serves as a conductor for transmitting an applied impact force to end 34. That is, end 36 of the shaft may be configured to receive without damage repetitive impacts from a manually operated hammer or the like and these forces are transmitted to end 34. Alternatively, end 36 of the shaft may be configured to cooperate with an automated impact tool or other such tool which imparts repetitive impacts on command. In this latter event, a transitional member 38 may be employed. The transitional member includes a mandrel 40 to which an impact tool is secured and a key 42 cooperating with a keyway 44 in end 36 of shaft 32. Preferably, the key and keyway are in the nature of a slip joing to permit angular misalignment between shaft 32 and transitional member 38.

Figure 5:
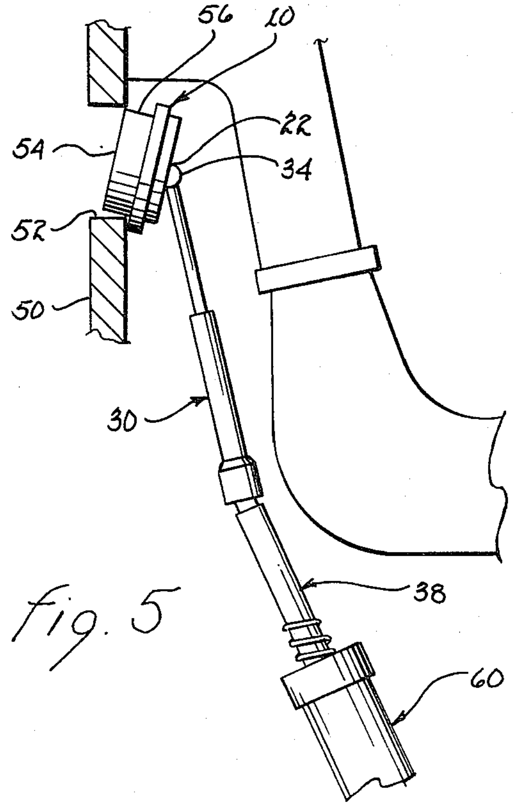
FIG. 5 illustrates installation of a freeze plug in confined quarters using the present invention.

Referring to FIG. 5, there is illustrated a typical freeze plug installation problem which is admirably solved with the present invention. Herein, an automotive internal combustion engine side wall 50 includes an aperture 52 disposed wherein. The aperture is to be sealed by freeze plug 54, which plug is to be force fitted within the aperture in response to impact forces applied thereto. Means, such as an exhaust manifold 56 may preclude direct access to aperture 52 along or proximate to the axis of the passageway defining the aperture.

The present invention permits installation of freeze plug 54 in the following manner. An impact distribution plate 10, having a land suitably sized to engage the annular terminal end of shroud 56 of the freeze plug, is selected and brought into mating relationship therewith. Manually, the freeze plug and impact distribution plate is brought into engagement with aperture 52 to the extent the operator can do so by manual means. Usually, positioning the freeze plug concentric with the aperture is about the best that can be done. To drive the freeze plug into the aperture, driver 30 is secured within the operative elements of an impact tool 60 and end 34 is located within the respective depression (22) of impact distribution plate 10.

On energization of the impact tool, repetitive impact forces will be transmitted through driver 30, whether or not transitional member 38 is employed, to the impact distribution plate through end 34 and depression 22. The mating fit therebetween creates multi-directional forces within the impact distribution plate. Of these multi-directional forces, the ones which produce or result in useful work are those having a component parallel to the axis of aperture 52. These forces will tend to drive and seat freeze plug 54 within the aperture until the impact distribution plate ultimately contacts wall 50 along the perimeter of the aperture.

By experimentation, it has been learned that the freeze plugs can be seated equally well by manually striking the driver with a hammer or the like.

Through error or because of difficulty of alignment, the freeze plug may be placed adjacent the aperture in a cocked position, as illustrated. Since the interconnection between the impact distribution plate and the driver does not require a set or fixed angle, transmission of the impact force to the impact distribution plate is unaffected. Thus, translation of the impact force to drive the freeze plug into the aperture is also unaffected.

The initial cocked position was at first thought to result in canted jamming of the freeze plug within the aperture. Such result is not consequential. The exact physical reasons for how and why the freeze plug will align itself with the axis of the aperture to effect proper and sealed penetration into the aperture are not fully understood. However, it is believed that such self-alignment results because of the angular latitude afforded by the nature or type of interconnection of the driver and the impact distribution plate. It may therefore by appreciated that the tool described is particularly useful in sealing apertures having difficult access and for apertures with which initial alignment of the freeze plug is difficult or impossible.

Figure 6:
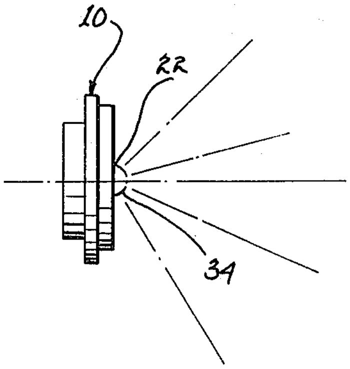
FIG. 6 depicts the wide angle through which an impact force may be transmitted by a driver to an impact distribution plate for seating a freeze plug.

FIG. 6 illustrates the above described benefit of the impact distribution plate 10 being capable of driving in and seating a freeze plug irrespective of the angular orientation of a driver with respect thereto within a very wide angle.

Because driver 30 can be employed in tight spaces, as illustrated in FIG. 5, the cost, in terms of labor, for installing freeze plugs in an automotive internal combustion engine is substantially reduced by the present invention over that of present procedures as few, if any ancillary equipments need to be first removed and subsequently reinstalled.

Freeze plugs, like most other apertures manufactured for use in a variety of products are relatively standard sized. In the automotive field, no more than six differently sized freeze plugs are employed. It is therefore possible to make a set of only three impact distribution plates and yet have a capability of installing any of all freeze plugs used in automotive internal combustion engines. A common driver would be used with any of the impact distribution plates. It will therefore become apparent that the tool described above is relatively nominal in cost yet simplifies the time and expense over that of presently used tools and practices for installing freeze plugs by a factor of at least two and possibly as much as ten.

While the principles of the invention have now been made clear in illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A tool for seating a shrouded freeze plug in response to impact forces received from a source of impact forces, said tool comprising in combination:

(a) a disc member for imparting an impact force to the freeze plug to seat the freeze plug;

(b) a first circular land disposed on one side of said disc member for engaging the shroud of the freeze plug and a second circular land disposed upon another side of said disc member, said second circular land being sized different from said first circular land to accommodate a freeze plug sized differently than the freeze plug engageable by said first circular land; and (c) means for interconnecting said member with the source of impact forces at any angle of interconnection within a cone of angles of interconnection and for transmitting the impact forces to the freeze plug to seat the freeze plug regardless of the angle of interconnection, said interconnecting and transmitting means comprising a first depression disposed within said first circular land, a second depression disposed within said second circular land and wherein said driver includes an end for mating with either of said first depression or said second depression.

2. The tool as set forth in claim 1 wherein each of said first depression and said second depression comprises a partially spherical surface and wherein said end of said driver includes a mating partially spherical surface.

3. The tool as set forth in claim 2 including a plurality of said disc member forming a set of discs, each of said discs including a pair of opposed circular lands and a depression formed in each of said circular lands, each said circular land being a unique size commensurate with a particularly sized freeze plug.

4. The tool as set forth in claim 2 wherein the source of impact forces comprises an impact tool for imparting the impact forces to said driver.

* * * * *